Figure 1:
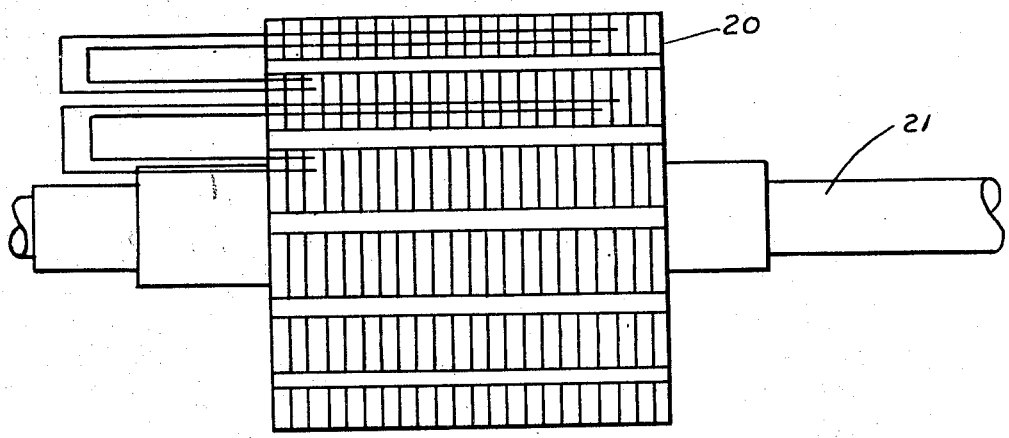

April 4, 1950     A. E. NASH     2,502,631
ARMATURE WINDING AND METHOD OF MAKING THE SAME Filed Nov. 2, 1946     3 Sheets-Sheet 1

INVENTOR.
ARTHUR E. NASH
BY Bates, Teare, & McBean
ATTORNEYS

April 4, 1950            A. E. NASH            2,502,631

ARMATURE WINDING AND METHOD OF MAKING THE SAME

Filed Nov. 2, 1946            3 Sheets-Sheet 2

INVENTOR.
ARTHUR E. NASH
BY Bates, Teare & McBean
ATTORNEYS

April 4, 1950 A. E. NASH 2,502,631
ARMATURE WINDING AND METHOD OF MAKING THE SAME
Filed Nov. 2, 1946 3 Sheets-Sheet 3

INVENTOR.
ARTHUR E. NASH
BY
Bates, Teare & McBean
ATTORNEYS

Patented Apr. 4, 1950

2,502,631

UNITED STATES PATENT OFFICE 2,502,631

ARMATURE WINDING AND METHOD OF MAKING THE SAME

Arthur E. Nash, Kent, Ohio, assignor of two-fifths to Gertrude M. Nash, one-fifth to Arthur E. Nash, Jr., one-fifth to William G. Nash, and one-fifth to Patricia J. Nash, all of Kent, Ohio Application November 2, 1946, Serial No. 707,507

10 Claims. (Cl. 171—206)

1

This invention relates to series connected armatures for electric motors and particularly to the windings on the armature and to a method of connecting the same to the commutator bars.

Heretofore series connected armatures have been wound by laying turns of a single strand of wire in the armature slots. Frequently two or more coils are wound in slot sets but each coil is wound individually and each lead loop is made individually. Such method, however, is costly, because of the time required to wind the coils individually. It would be advantageous, however, to wind two or more wires simultaneously, but such plan would result in a large number of leads and would be impractical, unless current detecting instruments were used at the time of assembly to assure selection of the proper leads for connection to the proper commutator bars so as to maintain continuity of the circuit through all of the coils. The use of instruments for such purpose, however, would be prohibitive, as it would increase the time required to complete the assembly to such an extent as would more than offset the time saved in winding the coils.

An object of the present invention is to provide an armature suitable for use in a series type electric motor, as well as a method of making the same, by means of which two or more wires may be wound simultaneously within a set of armature slots, and by means of which the leads will emerge from one slot and enter an adjacent slot in such manner as to permit identification of the end of one coil and the beginning of another merely by inspection. The invention comprehends additionally the establishment of a pattern of connecting the lead loops to the commutator bars which will make it possible for the operator to make the correct connection thereto before severing the lead loops without requiring tests with current detecting instruments to determine the identity.

I carry out the above objects by simultaneously winding at least two wires within a set of slots in a magnetic structure of an armature and by half filling such set of slots, then bringing out the wires on the last turn in the form of loops, which are sufficient in length to provide subsequent connection to commutator bars, and then continuing the winding to the next adjacent set of slots, again half filling the slots and bringing the wires out into loops and commencing the winding of the third set of slots. The operation is progressively continued until all of the slots are filled. As the winding progresses, however,

2 and the second half of the slots are filled, loops are brought out in the same manner so that eventually each slot will have four leads extending therefrom, two extending from the slot into the next adjacent slot to the left and two extending therefrom into the next adjacent slot to the right. Hence, by mere inspection, the operator can select the end of one coil and the beginning of the next for connection in a prearranged plan or pattern to the commutator bars so as to result in a single series wound circuit through all of the coils.

To facilitate the distinguishing of the windings for the purpose of making connections to the commutator bars, I may provide identification means on the respective wires, such as red insulation or color for one, and green insulation or color for another (in the case of two wires), and if desired, the two wires may be withdrawn from a single spool which previously has been wound therewith, or, if desired, the wires may be fed into the winding machine from individual spools. Alternative means of identification may comprise tracer threads of different color, or if desired, the identification may be accomplished by utilizing wires of the same color, but bringing the wires out into loops of different length, one length being used for wire that is drawn from one spool, and another length being used for wire that is drawn from the second spool.

Figure 6:
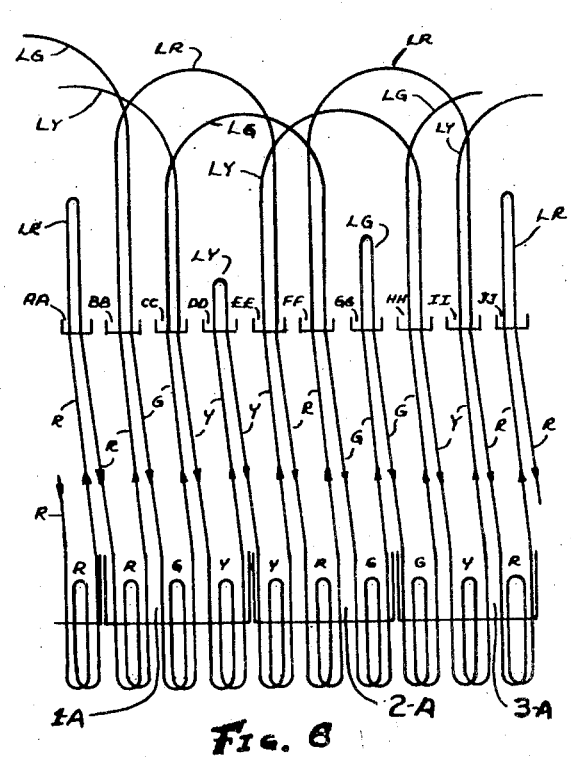
Figure 2:
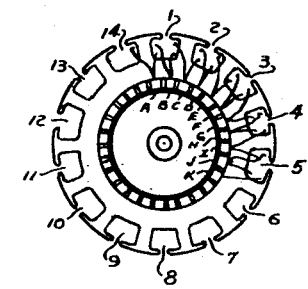
Figure 4:
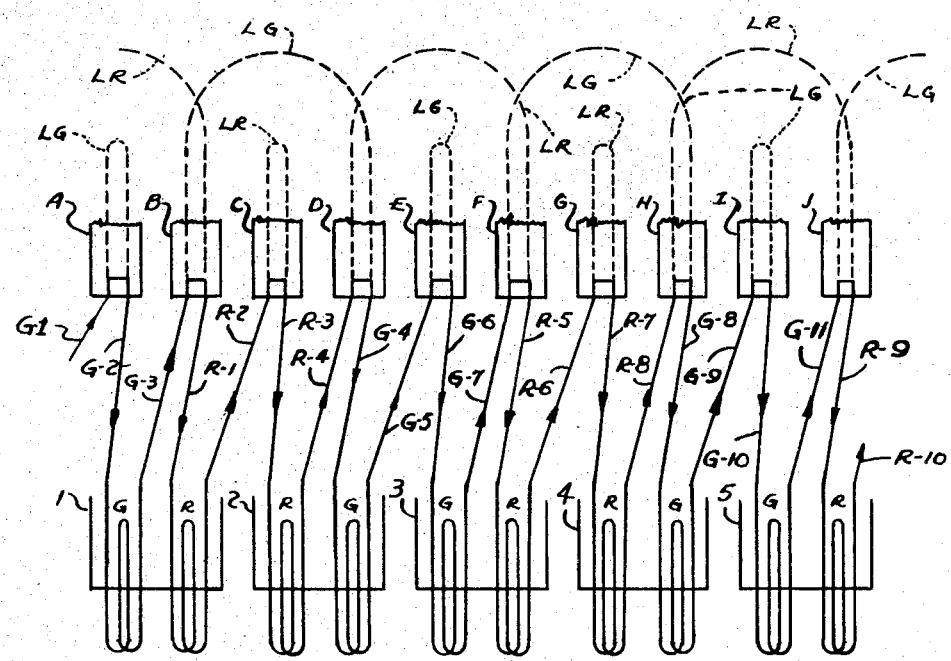
Figure 3:
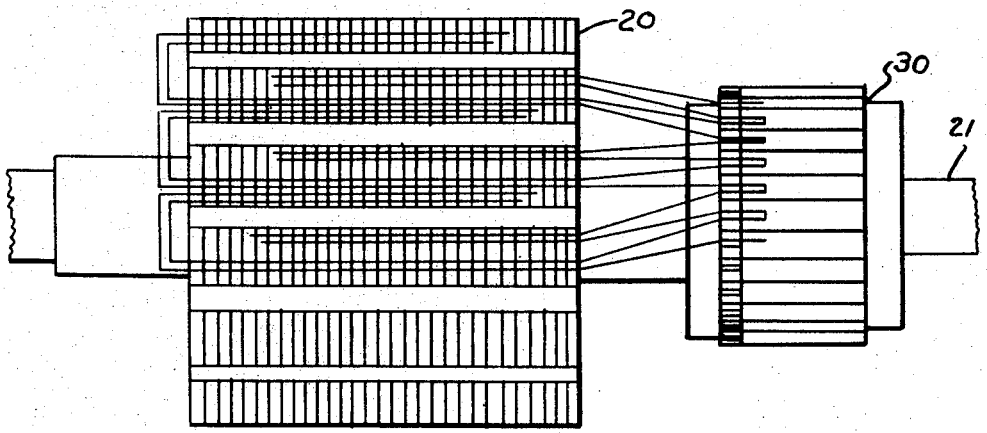
Figure 5:
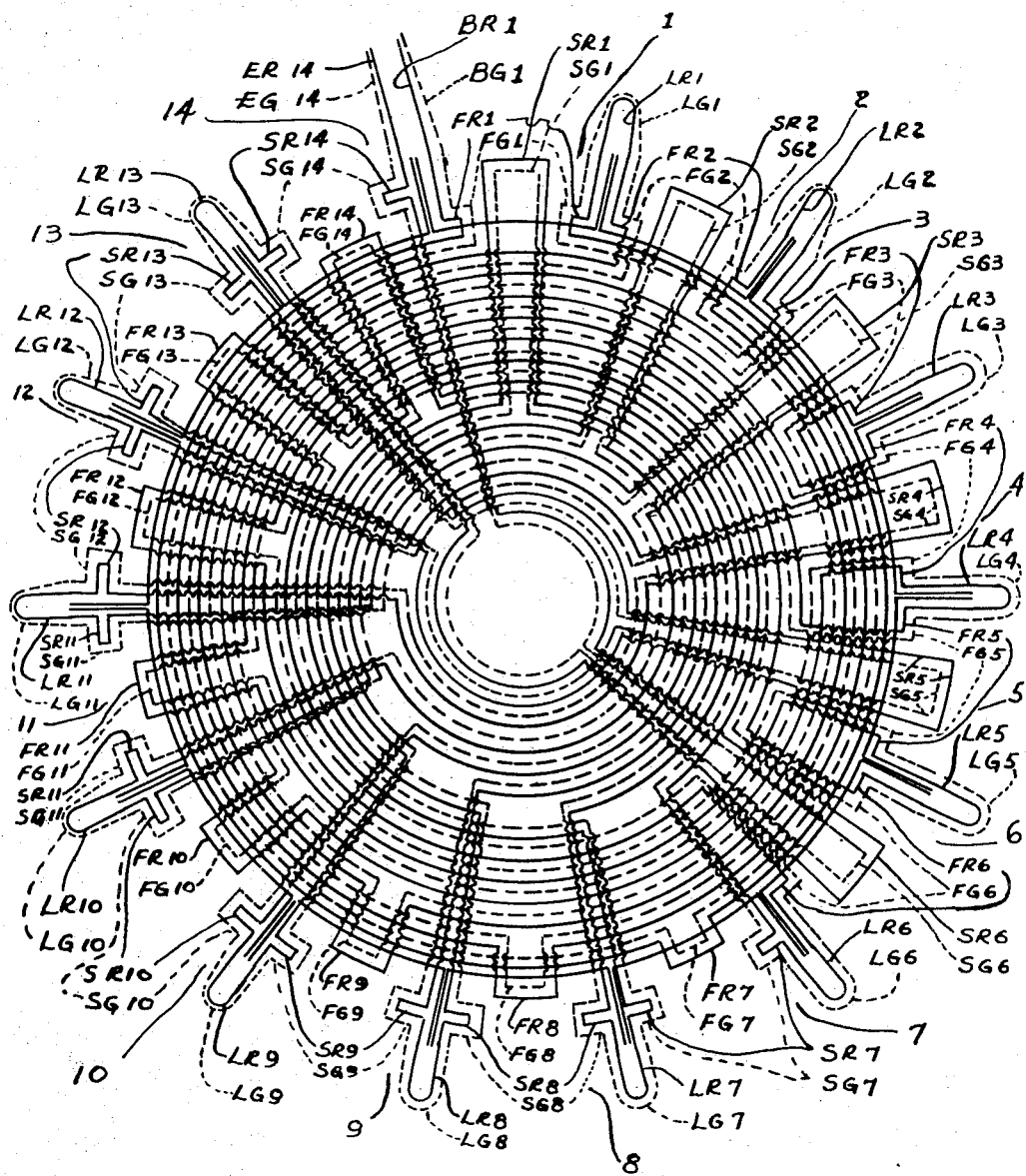

Referring now to the drawings, Fig. 1 is a front view of an armature that is wound in accordance with the present invention; Fig. 2 is an end view of the armature showing the wires connected to the commutator bars; Fig. 3 is a side view of the armature and commutator illustrating the method of connecting the wires to the commutator bars; Fig. 4 is a wiring diagram on an enlarged scale; Fig. 5 is a wiring diagram of a complete armature as viewed from the end and illustrating the manner of bringing the leads out in the form of loops which extend from one slot to the next adjacent slot, and Fig. 6 is a wiring diagram similar to Fig. 4, but showing a modified winding arrangement.

Armatures are wound in accordance with the present invention by laying wires in multiple simultaneously within one or more sets of slots in a magnetic structure 20 of an armature illustrated as being mounted on a shaft 21. The wires are wound in the slots in the customary way on any suitable winding machine that is usable for winding armatures. In Figs. 1 to 5, two wires are illustrated and the wires carry identification means, such as red color insulation for one and green color insulation for the other, but if desired, they may be distinguished by means of a tracer thread or any other suitable designating device.

At the beginning of the winding operation, a sufficient length of wire is allowed to extend from one end of the armature to provide leads, and then one set of slots is half filled as by turning the armature over in end-to-end relationship to the customary way in the conventional winding machine. The ends of the coils are brought out into loops on the same end of the armature and this may be accomplished by bringing the last half turn of each wire through the next adjacent slot, either to the right or to the left of that in which the coils have been wound, and then returning the wires in the opposite direction through the slots which the last coils have been wound. Thereupon the loops are made and the wires are led into the next adjacent slot and the winding continued in the same direction as that for winding the preceding set.

In Fig. 5 I have shown a wiring diagram wherein the armature slots are indicated from 1 to 14 in a clockwise direction. The winding is started with two wires, one of which is indicated at BR1 by a solid line and the other at BG1 with a broken line. The winding is started in slots 1 and 7, as a set, and at the completion of the coil, the wires are brought out in the form of loops LR1 and LG1 into slot 2, which then is paired with slot 8. The ends of the second coils terminate in loops LR2 and LG2, which are then carried over into slot 3 which in turn is paired with slot 9. The operation is continued progressively by advancing one slot at the start of a new coil. The loops are progressively continued as indicated at LR3 and LG3 to LR13 and LG13, and are finally brought out at slot 14 as ER14 and EG14, respectively, where they can be twisted to leads BR1 and BG1, respectively for temporary retention until the armature is ready for the operation of connecting the leads to the commutator bars.

In Fig. 5 the first half of the winding is indicated by the circular segmental portion nearest to the bottom of the slot as indicated by the circular segmental lines FR1 and FG1 in slot 1. In slot 2 the first winding is indicating at FR2 and FG2 and so on through the remaining slots where the designations appear as FR3 and FG3 to FR14 and FG14 respectively. Thus, in the case of slots 1 to 6 inclusive, the first winding is shown adjacent the sides of the slot, whereas in the slots 7 to 14 inclusive, the first windings are shown adjacent the mid-portions of the slot. Similarly, the second windings are initiated in slot 7 when the loops LR6 and LG6 are brought into slot 7 which previously had been wound with windings FR7 and FG7. The second windings in all of the slots are indicated at SR1 and SG1, to SR14 and SG14, in slots VI to 14 respectively. Thus in slots 1 to 6 inclusive, the second windings are indicated at the mid-portions of the slot, whereas in slots 7 to 14 inclusive, the second windings are indicated adjacent the sides of the slots. In actual practice, however, the first windings would be at one side of a slot and the second windings would be on the other side of the slot.

For convenience in following the winding diagram of Fig. 5, the coils are wound progressively in slot sets as follows:

First half of slot 1 and first half of slot 7
First half of slot 2 and first half of slot 8
First half of slot 3 and first half of slot 9
First half of slot 4 and first half of slot 10
First half of slot 5 and first half of slot 11
First half of slot 6 and first half of slot 12
Second half of slot 7 and first half of slot 13
Second half of slot 8 and first half of slot 14
Second half of slot 9 and second half of slot 1
Second half of slot 10 and second half of slot 2
Second half of slot 11 and second half of slot 3
Second half of slot 12 and second half of slot 4
Second half of slot 13 and second half of slot 5
Second half of slot 14 and second half of slot 6

The foregoing table shows that the armature slots are wound in pairs, and that at the completion of the winding of the first half the armature is indexed to the adjacent slots and that the operation is progressively repeated until all of the slots are filled.

From the inspection of Fig. 5, it will also be apparent that each slot has two leads entering from the next slot to the left, and has two leads leaving for entering the next slot to the right. Thus where red and green insulation is used, each slot would have two red leads and two green leads and in each instance the leads would leave one slot and enter the next adjacent slot form the end of the coil in one slot and the beginning of the coil in the next adjacent slot.

At the completion of the winding operation the wires are severed from the source of supply, after leaving a sufficient length indicated at ER14 and EG14, in Fig. 5, to provide leads comparable to the length of the other leads for attachment to the commutator bars. The end leads may then be twisted to the corresponding leads BR1 and BG1 to simulate loops corresponding to the other loops for the guidance of the operator who connects the leads to the commutator bars. Thus, the entire winding operation may be performed without cutting or severing the wires to make leads.

After the completion of the winding operation, the insulation is removed from the loops in the region of intended connection thereof to the commutator bars and then the commutator 30 is placed upon the shaft in spaced relation to the armature. The leads are then connected thereto in a manner that will result in one complete circuit through the coils although the armature was wound initially with two wires. To facilitate the connecting operation, the commutator bars are indicated diagrammatically in Fig. 4 at A to J, inclusive, and are provided with slots adjacent the mid-portion thereof at the ends nearest to the armature. The leads are then brought from the near end of the armature and are laid in the slots in a predetermined pattern, as will hereinafter be set forth. Thereafter the surplus loop portions, designated by the dotted lines LG and LR, are severed and the wound armature is then tested for bar to bar connection and for the correct flow of current.

The pattern for connecting the leads from the coils to the commutator bars is illustrated diagrammatically in Fig. 4, wherein a series of adjacent armature slots are designated 1, 2, 3, 4, and 5, and wherein a series of corresponding commutator bars are designated A to J, inclusive. For convenience, each armature slot is shown as having two coils, one designated R (red insulation or color) and the other designated G (green insulation or color). Starting at the left hand side of the diagram, the circuit through the coils is made by a green lead, designated G1 which is connected to the commutator bar A, thence through lead G2 to coil G in armature slot 1, thence through lead G3 to commutator bar B. The lead G3 and the lead R1 for coil R in armature slot 1 are connected together at commutator bar B, from whence current flows through coil R, through lead R2, through commutator bar C, thence through lead R3 to coil R in commutator slot 2 and out through lead R4 to commutator bar D.

From commutator bar D current flows into coil G in commutator slot 2 through lead G4, and thence out through lead G5 and into commutator bar E, continuing to the coil G in armature slot 3 through lead G6, and out through lead G7 to commutator bar F. From bar F current flows through the lead R5 to the coil R in armature slot 3 in the same manner as the connection made at commutator bar B, and then the connection pattern is repeated between the coils in slots 3, 4 and 5 and bars G, H, I, and J, the same as occurred between the coils in slots 1, 2 and 3 and bars B to F, inclusive. For the purpose of brevity, such leads are successively designated R6 to R10 inclusive, and G8 to G11, inclusive.

From the foregoing description, it will be apparent that the alternate commutator bars have connections made to leads of one color, but alternately disposed. For example, commutator bars A, E and I have green leads connected thereto, while bars C and G have red leads connected thereto. It will also be apparent that each of the remaining bars has a green lead and a red lead connected thereto, both of which extend to coils in the same slot, whereas in the case of the first-mentioned bars, the leads extend to coils in adjacent slots.

Thus, in making the connections it is a comparatively simple matter for the operator to connect the leads of the same loop, such as the red in one instance, and the green in another instance, to alternately spaced bars, and then to connect the leads of oppositely designated loops to the intermediate bars in regular pattern around the armature, thereby resulting in a series connection for all of the coils. The foregoing operation may be accomplished with ease and with dispatch on a series connected armature of an electric motor, particularly in a motor wherein the armature is approximately 2" in diameter and has 14 slots. Such an arrangement utilizes 28 commutator bars and 56 leads from the coils. Heretofore the connection of lead loops of coils wound in plurality for series connected armatures to connect commutator bars was considered to be so difficult that the cost would prohibit its practice, but by means of the present invention, and by following the pattern outlined, the operation is comparatively simple and may be performed without the need for instruments to effect a proper selection of lead and bar.

While I have described the invention as utilizing two coils to each slot, I may, if desired, use three or more coils per slot depending on the size of the armature, and in such case I utilize the same number of bars as coils, and I follow the principle outlined in Fig. 4. Thus, for example, in Fig. 6 I have shown three coils per slot, designated R, G, and Y, (red, green and yellow insulation or color identification respectively), and I have indicated the commutator bars at AA to JJ respectively. In this arrangement every third bar is connected to leads of the same color but to coils in adjacent slots, whereas the remaining intermediate bars are connected to leads of dissimilar color but to coils in the same slot. Thus, bar BB is connected to red and green leads, while bar CC is connected to green and yellow leads for the coils in slot 1A, whereas bar EE is connected to yellow and red leads and bar FF is connected to red and green leads from the coils in slot 2A. Similarly, bar HH is connected to green and yellow leads and bar II is connected to yellow and red leads from the coils in slot 3A. The various loops are designated by LR, LG and LY respectively.

The principle underlying the pattern of connections for the multiple coils is that leads of the same color are connected at regular intervals to a single bar—every second bar for two coils per slot, and every third bar for 3 coils per slot, and so on—whereas the intermediate coils are connected to leads of different colors extending from coils in the same slot. One method of facilitating the application of the leads to the bars is to separate the loops, placing half the loops, in the case of a two coil winding, with the colors alternating along the commutator bars, and bending the other loops radially where they will not interfere with the operation of connecting the axially extending loops to the respective bars. After the axially extending loops are connected, the others may be progressively bent axially and connected to the intermediate bars to complete the connecting operation. In the case of a three coil per slot winding, as shown in Fig. 6, every third loop is extended axially while the others are bent radially. Thereafter the radially extending loops are again separated, one-half being bent axially and progressively connected to the bars, and finally the remaining group is connected.

To lay multiple coils in parallel within the armature slots, the wires may be drawn from different spools, or if desired, may be drawn from a single spool which has previously been wound with wires having different identifying means thereon. In either case, the invention has greatly reduced the time required for the winding operation and has considerably minimized the chance of error in making the connections between the leads and bars.

I claim:

1. An armature for electric motors wherein the armature includes a plurality of slots and a plurality of commutator bars, each slot having a plurality of current conducting coils therein, each coil being wound with wire having leads with different identification means thereon, the leads from the coils being connected to the commutator bars in such manner that some of the bars in regular spaced relationship are connected to two leads of the same identification, while the remaining bars are each connected to two leads of different identification.

2. In an electric motor, an armature comprising a magnetic structure having parallel slots therein and having commutator bars spaced from the magnetic structure, at least two coils of current conducting material wound in parallel in the respective slots from wires having different identifying means thereon, the beginning and the end of each coil in each slot extending outwardly therefrom and being connected to the commutator bars, with an incoming lead of one coil and an outgoing lead of another coil in the same slot being connected to a common commutator bar and with the outgoing lead from one slot and the incoming lead of the same wire in an adjacent slot being connected to another common commutator bar, whereby spaced commutator bars separated at regular intervals by at least one bar have two leads of the same identification connected thereto and the intermediate bars having leads of different identification connected thereto.

3. An armature for electric motors wherein the armature includes a plurality of slots and a plurality of commutator bars, each slot having a plurality of current conducting coils therein wound from two wires, the portions of the wires forming the ends of the coils in one slot and the portions of the wires forming the beginning of a coil in an adjacent slot comprising loops which have different identification means thereon, the loops of the same identification having the leads thereof connected to every other commutator bar with the identifications alternating, and the remaining bars being connected to two leads of different identification which emerge from the same commutator slot.

4. An armature for electric motors comprising a magnetic structure having a plurality of slots therein, a plurality of commutator bars, coils wound in said slots, there being three separate wires used in making the coils, portions of the wires forming the ends of coils of one slot and beginning of the coils in an adjacent slot comprising leads in the form of loops, means associated with the loops for enabling the wires to be distinguished from each other, the leads from the respective coils being connected to the commutator bars in such a manner that every third bar in regular spaced relationship is connected to the leads of the same loops, with the identifications alternating around the commutator, while the remaining intermediate bars are each connected to two leads of different identification from the same slot.

5. A method of making armatures for electric motors comprising simultaneously winding a plurality of coils of different wires by half filling a set of slots of an armature, bringing out into loops those portions of the wires which form the ending of the coils in one set of slots and the beginning of the coils in an adjacent set of slots, continuing the winding by half filling the next adjacent set of slots, providing the loop portions with different means of identification, progressively continuing the winding until all of the slots are filled, connecting the leads of the same identification and from the same loop to regularly spaced bars and connecting leads of different identification to the intermediate bars whereby all of the coils are connected in a single continuous circuit.

6. A method of making armatures for electric motors comprising simultaneously winding a plurality of coils of different wires by half filling each slot in an armature, and progressively continuing the winding until all of the slots are filled, the wires being designated for example as G and R, bringing out the leads from the ends of the coils in each slot in the form of loops during the winding operation and connecting the leads to commutator bars in a repeated pattern that will result in a single continuous circuit through all of the coils in all of the slots, the pattern of connection to the bars being as follows: a first bar being connected to the outgoing G lead from a first slot and to the incoming lead G to a second slot, a second bar being connected to the outgoing G lead and to the incoming R lead for said second slot, a third bar being connected to the outgoing R lead from the second slot and to the incoming R lead to the third slot, the fourth bar being connected to the outgoing R lead from the third slot and to the incoming G lead for the third slot, and the fifth bar being connected to the outgoing G lead from the third slot and to the incoming G lead for the fourth slot, said incoming G lead for the fourth slot corresponding to the incoming G lead of the second slot, and then repeating the pattern until all of the leads have been connected to the commutator bars.

7. A method of making armatures for electric motors, comprising simultaneously winding two coils of different wires but having different identifying means thereon, by half filling each slot in an armature, bringing out the ends of each coil in the form of loops during the winding operation, progressively continuing the winding until all of the slots are filled, and connecting the leads to commutator bars in a manner that will result in a single continuous circuit through all of the coils in all of the slots, the pattern of the connection to the bars being as follows: every other bar being connected to a lead of one identification and to a lead of a different identification from leads that emerge from the same slot, and each intermediate bar being connected to leads of an identical identification emerging from adjacent slots, said last-mentioned identification alternating on the intermediate bars.

8. A method of making armatures for electric motors, comprising simultaneously winding coils from three separate wires by half filling the slots of the magnetic structure of an armature, bringing out the portions of wire forming the ends of the coils in the form of loops, continuing the winding by half filling the next adjacent set of slots, progressively continuing the winding until all of the slots are filled, providing identification means on the different loops and connecting the leads to commutator bars in a manner that will result in a single continuous circuit through all of the coils, the pattern of the connection to the bars being as follows: every third bar being connected to two leads of one identification from the same loop, the identifications alternating on every third bar and the intermediate bars being connected to leads of different identification which emerge from the same armature slot.

9. An armature for electric motors having spaced slots therein and having multiple coils wound in parallel arrangement in said slots, a commutator having spaced bars therein, the wires of said coils terminating in leads having different identifying means associated therewith, and the leads being connected to the bars in a manner to provide a single continuous circuit through all of the coils, the pattern of the connection to the bars being as follows: every other bar being connected to a lead of one identification and to a lead of a different identification from leads that are brought out from the same slot, and each intermediate bar being connected to leads of an identical identification emerging from adjacent slots, said last-mentioned identifications alternating on the intermediate bars.

10. An armature for electric motors comprising a magnetic structure having a plurality of slots therein, a pair of current conducting coils wound in each of said slots and comprising wires having leads with different identifying characteristics, there being twice as many commutator bars as there are slots, and each lead of one identification from one slot being connected to the same bar as the lead of the same identification to an adjacent slot, and the leads of different identification from the same slot being connected to the same bar but different from the first-mentioned bar.

ARTHUR E. NASH.

REFERENCES CITED

The following references are of record in the file of this patent:

UNITED STATES PATENTS

| Number | Name | Date |
| --- | --- | --- |
| 1,661,332 | Gomory | Mar. 6, 1928 |
| 1,749,673 | Pestarini | Mar. 4, 1930 |

OTHER REFERENCES

Dawes, Electrical Engineering, vol. 1, page 227.